United States Patent
Warner

(10) Patent No.: US 9,426,004 B1
(45) Date of Patent: *Aug. 23, 2016

(54) METHOD FOR REDUCING JITTER IN RECEIVERS

(71) Applicant: PMC-SIERRA US, INC., Sunnyvale, CA (US)

(72) Inventor: William D. Warner, Maple Ridge (CA)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,508

(22) Filed: May 1, 2015

Related U.S. Application Data

(63) Continuation of application No. 13/941,902, filed on Jul. 15, 2013, now Pat. No. 9,143,371.

(51) Int. Cl.
*H04L 27/06* (2006.01)
*H04L 25/08* (2006.01)
*H04L 27/01* (2006.01)
*H04L 1/20* (2006.01)
*H04L 25/03* (2006.01)

(52) U.S. Cl.
CPC .............. *H04L 25/08* (2013.01); *H04L 1/205* (2013.01); *H04L 27/01* (2013.01); *H04L 2025/0377* (2013.01)

(58) Field of Classification Search
CPC ...................................................... H04L 25/08
USPC ......................................................... 375/231
See application file for complete search history.

(56) References Cited

U.S. PATENT DOCUMENTS

| | | | |
|---|---|---|---|
| 5,990,814 A * | 11/1999 | Croman | H03K 5/2481 341/118 |
| 8,243,782 B2 | 8/2012 | Mobin et al. | |
| 8,428,113 B1 | 4/2013 | Katic et al. | |
| 9,143,371 B1 * | 9/2015 | Warner | H04L 25/08 |
| 2002/0027963 A1* | 3/2002 | Imanaka | H03L 7/091 375/341 |
| 2008/0049350 A1 | 2/2008 | Bruner et al. | |
| 2009/0304064 A1* | 12/2009 | Liu | H04L 25/03057 375/232 |
| 2010/0008414 A1 | 1/2010 | Lee et al. | |
| 2010/0177816 A1 | 7/2010 | Malipatil et al. | |
| 2010/0329319 A1 | 12/2010 | Dai et al. | |
| 2010/0329322 A1 | 12/2010 | Mobin et al. | |
| 2012/0076508 A1 | 3/2012 | Mezer et al. | |
| 2012/0269305 A1 | 10/2012 | Hogeboom | |
| 2013/0101000 A1 | 4/2013 | Warke et al. | |
| 2013/0202022 A1 | 8/2013 | Cai | |
| 2013/0278088 A1 | 10/2013 | Bahr | |

OTHER PUBLICATIONS

Carusone, "An Equalizer Adaptation Algorithm to Reduce Jitter in Binary Receivers", IEEE Transactions Circuits & Systems II, vol. 53, No. 9, Sep. 2006, pp. 807-811.

(Continued)

*Primary Examiner* — Lihong Yu
(74) *Attorney, Agent, or Firm* — Dennis R. Haszko

(57) ABSTRACT

A receiver equalizer that provides improved jitter tolerance relative to common adaptation mechanisms and that also provides inter-symbol interference. Improved jitter tolerance is an important benefit for SERDES receivers as tolerance to Sinusoidal Jitter is an important performance metric specified in most industry standards.

15 Claims, 15 Drawing Sheets

(56) References Cited

OTHER PUBLICATIONS

Wong et al., "Modified LMS Adaptation Algorithm for a Discrete-Time Edge Equalizer of Serial I/O", IEEE Asian Solid-State Circuits Conference (ASSCC), Nov. 13-15, 2006, pp. 387-390.

Toifl et al., "Low-Complexity Adaptive Equalization for High-Speed Chip-to-Chip Communication Paths by Zero-Forcing of Jitter Components", IEEE Transactions on Communications, vol. 54, No. 9, Sep. 2006, pp. 1554-1557.

Brunn, "Edge-Equalized NRZ", HP Labs, Palo Alto, CA, 2004 [Online]. Available: http://www.ieee802.org/3/ap/public/jul04/brunn_01_0704.pdf, 11 pages.

Boyd et al., "Common Electrical I/O (CEI)—Electrical and Jitter Interoperability agreements for 6G+ bps, 11G+ bps and 25G+ bps I/O", Optical Internetworking Forum (OIF), OIF-CEI-03.0, Sep. 1, 2011, 242 pages.

Cox et al., "Information Technology—Serial Attached SCSI-3 (SAS-3)", Working Draft American National Standards Institute (ANSI) Project T10/2212-D, Jan. 31, 2013, 325 pages.

Gardner, "A BPSK/QPSK Timing-Error Detector for Sampled Receivers", IEEE Transactions on Communications, vol. COM-34, No. 5, May, 1986, pp. 423-429.

Cox et al., "Information technology—Serial Attached SCSI-3 (SAS-3)". Working Draft American National Standard-Project T10/BSR INCITS 519, American National Standards Institute (ANSI), Global Engineering Documents, an IHS Company, Englewood, CO., Nov. 7, 2013, 340 pages.

Eshet et al., "An Adaptive 4-Tap Analog FIR Equalizer for 10-Gb/s Over Backplane Serial Link Receiver", Solid-Slate Circuits Conference, Edinburgh, Sep. 15-19, 2008, pp. 178-181.

Ungerboeck, "Fractional Tap-Spacing Equalizer and Consequences for Clock Recovery in Data Modems", IEEE Transactions on Communications, vol. COM-24, No. 8, Aug. 1976, pp. 856-864.

U.S. Appl. No. 13/941,902, Office Action dated Mar. 10, 2015, 9 pages.

U.S. Appl. No. 13/957,852, Office Action Issued dated Sep. 5, 2014, 8 pages.

U.S. Appl. No. 13/957,852, Notice of Allowance dated Jan. 22, 2015, 11 pages.

U.S. Appl. No. 13/941,902, Notice of Allowance dated May 22, 2015, 8pgs.

\* cited by examiner

METHOD FOR REDUCING JITTER IN RECEIVERS

CROSS REFERENCE TO RELATED APPLICATIONS

This application is a continuation of application Ser. No. 13/941,902, filed Jul. 15, 2013, which is hereby incorporated by reference.

FIELD

The present disclosure relates generally to receivers. More particularly, the present disclosure relates to reducing jitter and inter-symbol interference in receivers.

BACKGROUND

High speed data communication between physically separated integrated components is a common function in current communication infrastructure systems. The separated integrated circuits can be physically separated on a common circuit board, or on separate circuit boards connected by a backplane, cable, or other communication medium.

As the data rate increases, as the physical separation distance increases, and/or the quality of the communication medium decreases, the transmitted signal will be increasingly impaired by a process commonly called Inter-Symbol Interference (ISI). ISI effectively smears the transmitted pulse waveform such that, at the receiver, each received pulse contains portions of signal energy from previously transmitted symbols (called Post-Cursor ISI) and may even contain portions of signal energy from symbols yet to be received (called Pre-Cursor ISI).

The phenomenon of ISI is well understood by those knowledgeable in the art. It is also well known that the impairment process of ISI can largely be mitigated through the use of equalizers, whether they are analog equalizers, digital equalizers, or combination of both. Within the scope of digital equalization, the equalizer can be in the form of a Finite Impulse Response (FIR), Infinite Impulse Response (IIR), Decision Feedback Equalizer (DFE), among others. Within the scope of analog equalization, the equalizer can be in the form of a Continuous Time Linear Equalizer (CTLE), Analog FIR, among others.

Often, a complicating issue is that the characteristic response of the transmission channel is unknown and can change from one installation to another. In these cases, a calibration, or adaptation process must be implemented to determine the required configuration of the receive equalizer that will exhibit the least ISI.

One type of common receiver architecture has the receiver sampling the received signal at a frequency that is twice the baud rate of the received signal. Using timing recovery strategies of known art, such as, for example, the Gardner method (F. M. Gardner, "*A BPSK/QPSK Timing-Error Detector for Sampled Receivers*", IEEE Transactions on Communications, vol. COM-34, No. 5, May 1986), the sampling of the received waveform is adjusted such that one set of alternating samples aligns with the center of the received symbol waveform pulse with the opposite alternating samples aligning with the point mid-way between consecutive symbol pulses. FIG. 1 depicts such a common, prior art receiver architecture including EQ adaptation.

Shown in FIG. 1 is an analog signal, or received analog signal 30, that contains bit sequences having a baud rate (symbol rate). The received analog signal is sampled, at twice the baud rate, and digitized by an analog to digital converter (ADC) 32. The digitized output 33 of the ADC 32 is provided to a finite impulse response equalizer (FIR EQ) 34. The FIR EQ 34 modifies (controls) the digitized output 33 and provides, at the output of the FIR EQ 34 an equalized signal 35. The equalized signal 35 is provided to a a Serial In/Parallel Out (SIPO) device 36, which can also be called as serializer/deserializer device. The SIPO device 36 outputs a data signal 37 and a timing signal 38, each being a digital signal and each having the nominal baud rate to the received analog signal 30.

The timing digital signal 38 and the data signal 37 are provided to a timing error detector (TED) 39, which controls the timing of a sample clock 40; the sample clock 40 controls the ADC 32. With respect to the data signal 37, it is processed by a slicer 42, whose output symbol signal 48 can be Boolean values "0", or "1", or, can be the constellation equivalent of the Boolean values, i.e., a "−1" or a "+1". A summation device 44 takes the difference between the output symbol signal 48 and the data signal 37. The difference 45 is provided to a controller (or adapter) 46, which controls the FIR EQ 34 as a function of the difference 45, and as a function of the digitized output 33.

FIG. 2 depicts an exemplary "eye diagram" of the received waveform and the location of the waveform sampling instances as provided by the timing recovery mechanism of FIG. 1. A data sample $DS_n$ is obtained by setting the sample clock 40 such that the middle of the eye in the eye diagram of FIG. 2 is sampled by the ACD 32. Timing samples $TS_{n-1}$ and $TS_n$ are obtained by sampling midway between adjacent eyes The ADC 32 can have many threshold levels (e.g., 32 levels as provided by a 5-bit ADC), or can have fewer levels (e.g., 2-levels as provided by a 1-bit slicer).

FIG. 3 shows the same eye diagram as in FIG. 2 but superimposed with boundaries 50 defining areas within which signals samples are likely to be present/measured. FIG. 4 shows only the boundaries 50 of FIG. 3.

A common means of adapting a digital FIR receiver equalizer is to use the Least Mean Square (LMS) algorithm to minimize the signal variation of the signal samples centered in the middle of the eye. Those knowledgeable in the art will recognize that the LMS algorithm is a simple to implement method of approximating the Minimum Mean Square Estimate (MMSE) which minimizes the combination of ISI and noise power at the Baud Sample.

While the LMS algorithm applied to eye-centered samples is a commonly used approach to receiver EQ adaptation, and one that optimizes the vertical eye opening at the location of the center eye sample, it is known to be sub-optimal with respect to the horizontal eye opening (for example, see A. C. Carusone, "*An Equalizer Adaptation Algorithm to Reduce Jitter in Binary Receivers*", IEEE Transactions on Circuits and Systems—II: Express Briefs, Vol. 53, No. 9, September 2006). For example, the exemplary eye diagram of FIG. 4 could be transformed, by an LMS algorithm applied to eye-centered samples, into the eye diagram of FIG. 5, which has a diminished horizontal opening. Those knowledgeable in the art will recognize that the vertical eye has been improved due to the reduction in ISI at the center of the eye, but the horizontal eye opening has been compromised (reduced), and hence, tolerance to sinusoidal jitter has been reduced. The reduction in ISI is shown in FIG. 5 at reference numeral 52 and the reduced horizontal opening is shown at reference numeral 54.

To mitigate this problem, a common technique in current art is to adapt the receiver EQ (e.g., the FIR EQ 34 in FIG. 1) with the purpose of minimizing the amplitude variation at the zero-crossing between symbols of opposite polarity. Such zero-crossing areas are shown in FIG. 6, at reference numeral 56. While this typically improves horizontal eye opening relative to that provided by normal eye center LMS adaptation, it has been found that zero-crossing adaptation is not reliable when the received signal is impaired by strong sinusoidal jitter or transient timing offset due to other impairments such as spread spectrum frequency modulation.

Therefore, improvements in receiver equalization are desirable.

SUMMARY

In a first aspect, the present disclosure provides a method of controlling a receiver equalizer. The method comprises: receiving an analog signal having a baud rate; sampling the analog signal at a sampling rate of twice that of the baud rate, the sampling to obtain a sampled signal that includes two interleaved digital signals, a first signal of the two interleaved digital signals being a data signal, the data signal comprising data samples sampled at the center of each consecutive symbol of the analog signal, a second of the two interleaved digital signal being a timing signal, the timing signal comprising timing samples sampled between the consecutive symbols; calculating a timing error term for timing samples comprised between data samples that define non-zero crossing transitions; and controlling the receiver equalizer as a function of the timing error term.

In a second aspect, the present disclosure provides a receiver. The receiver comprises: a sampling means for sampling an analog signal having a baud rate, the sampling means to sample the analog signal at a sampling rate of twice that of the baud rate, the sampling to obtain a sampled signal that includes two interleaved digital signals, a first signal of the two interleaved digital signals being a data signal, the data signal comprising data samples sampled at the center of each consecutive symbol of the analog signal, a second of the two interleaved digital signal being a timing signal, the timing signal comprising timing samples sampled between the consecutive symbols; processing means operationally connected to the sampling means, the processing means to calculate a timing error term of timing samples comprised between data samples that define non-zero crossing transitions; an equalizer to equalize one of the sampled signal and the analog signal; and a control module operationally connected to the processing means and to the equalizer the control module to control the equalizer as a function of the timing error term.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
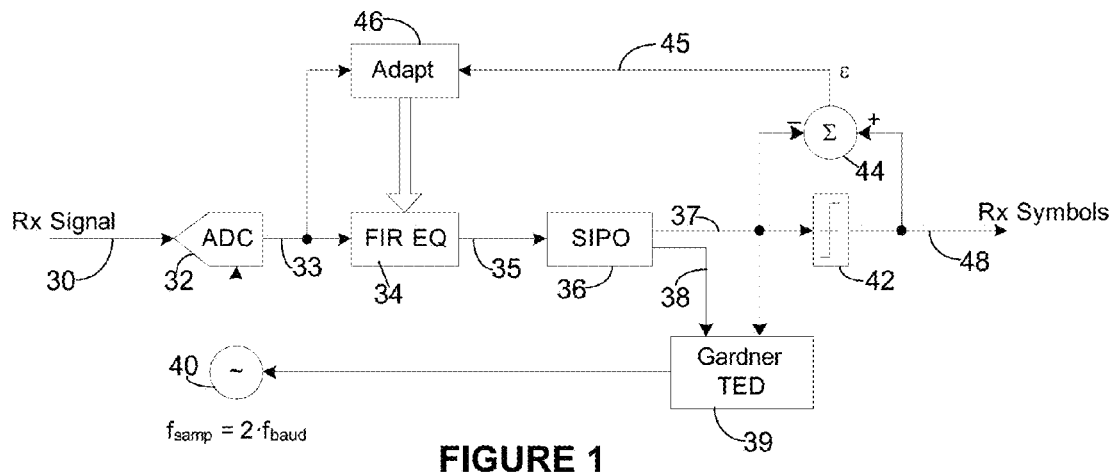
FIG. 1 shows a prior art receiver architecture.
Figure 2:
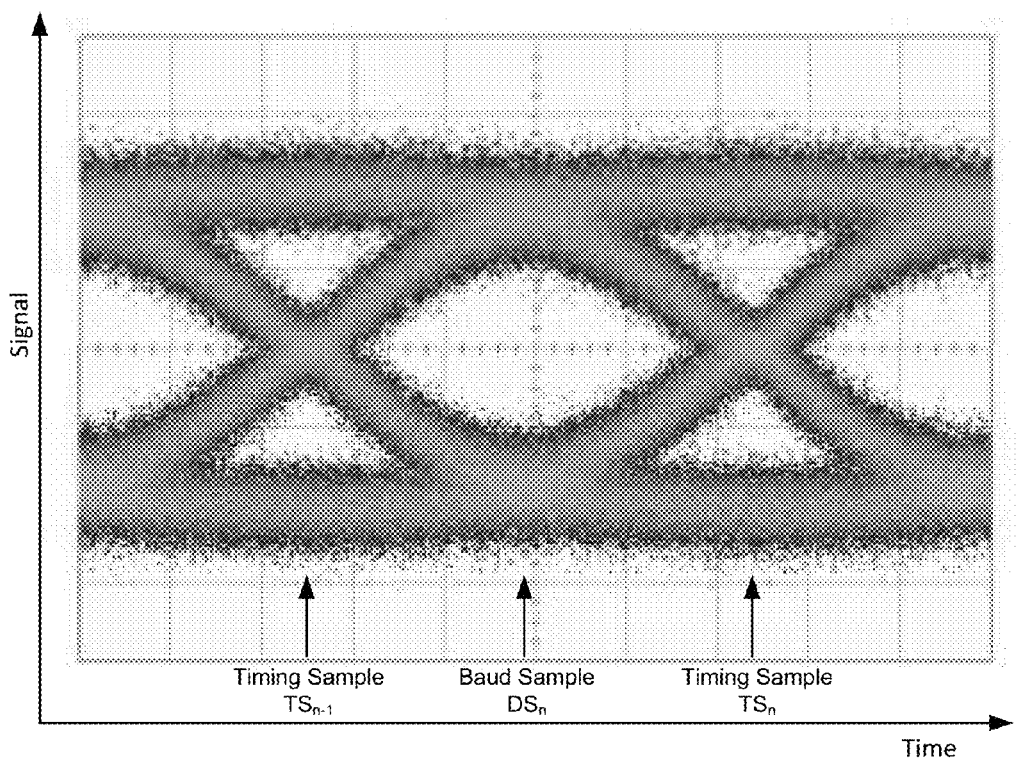
FIG. 2 shows an example of an eye diagram.
Figure 3:
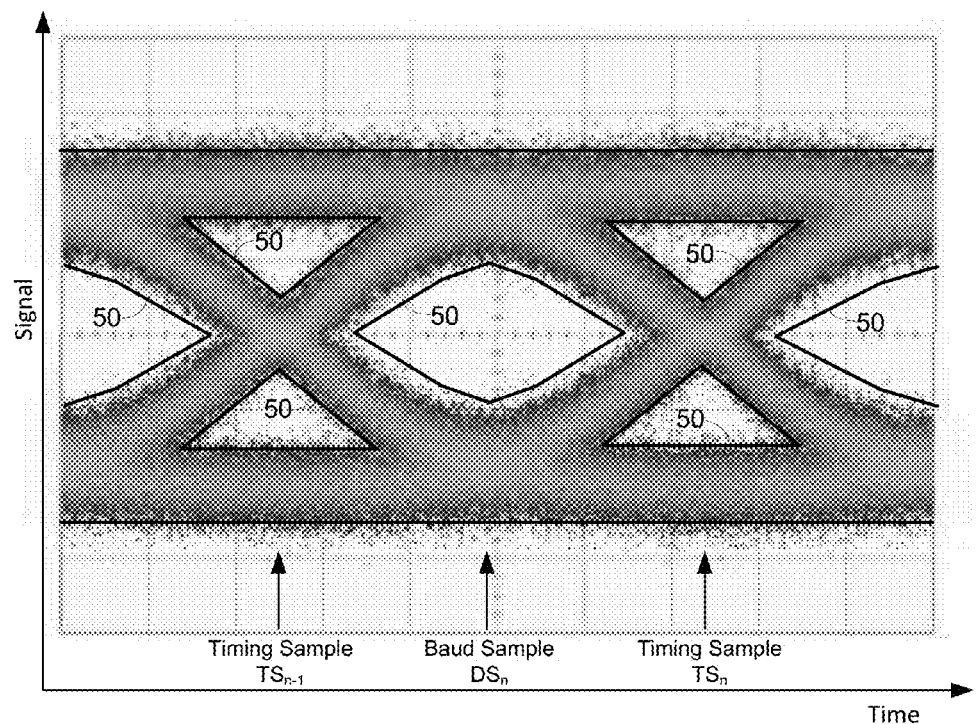
FIG. 3 shows the eye diagram of FIG. 2 superimposed with boundaries of the eye-diagram.
Figure 4:
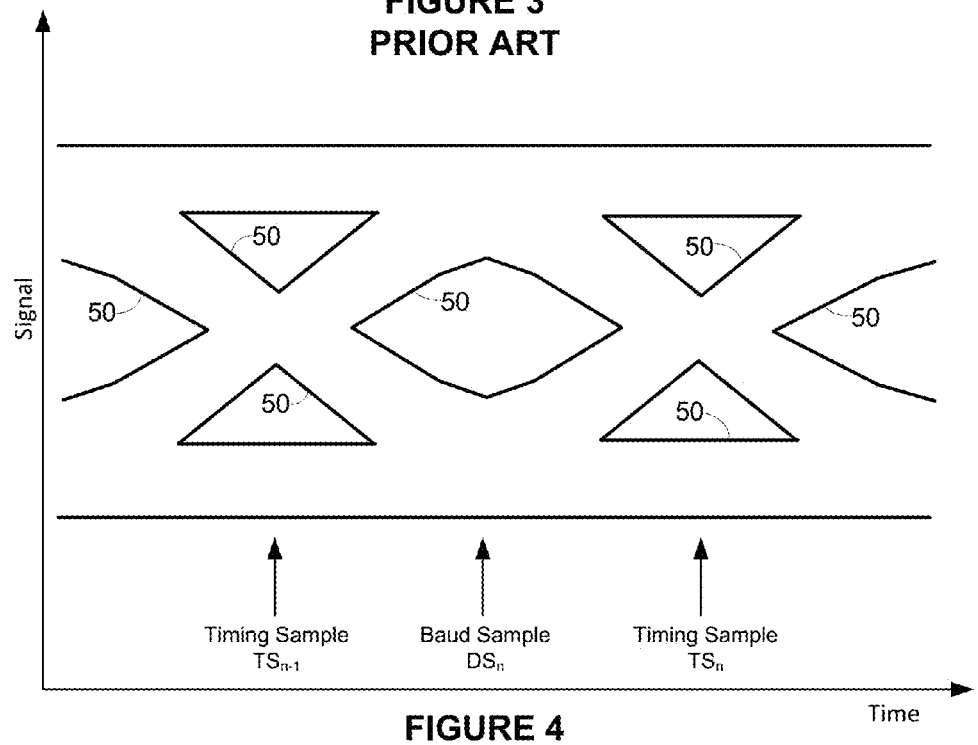
FIG. 4 shows the eye diagram boundaries of FIG. 3.
Figure 5:
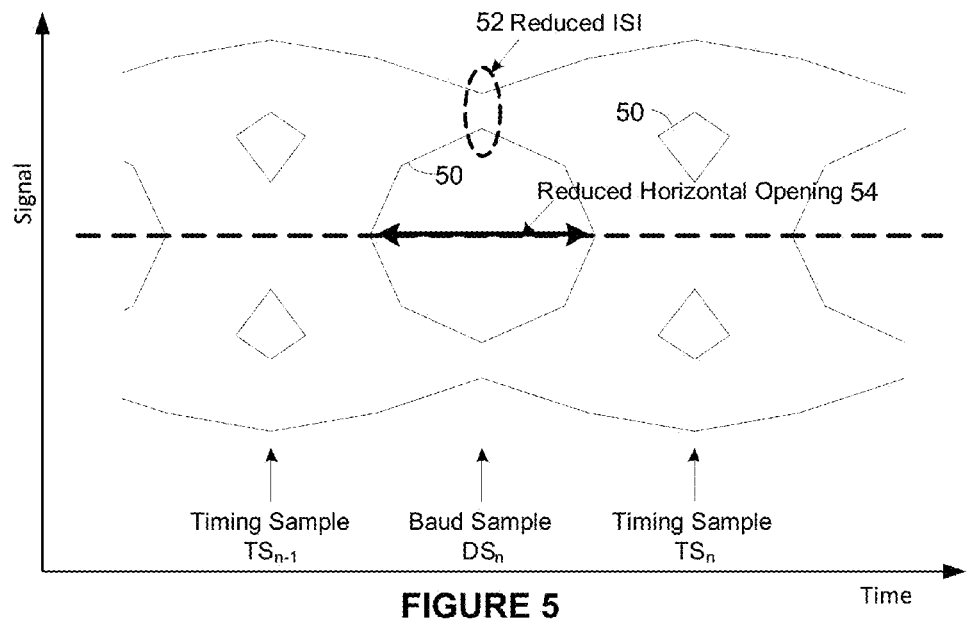
FIG. 5 shows boundaries of a modified eye-diagram.
Figure 6:
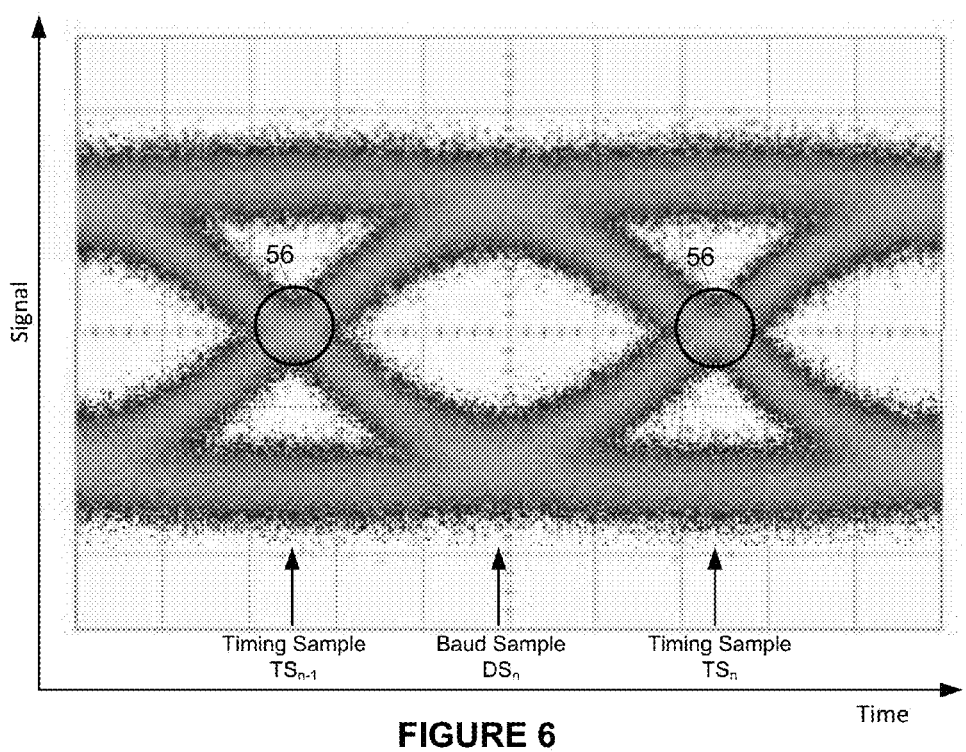
FIG. 6 shows an eye-diagram with zero-crossing areas.
Figure 7:
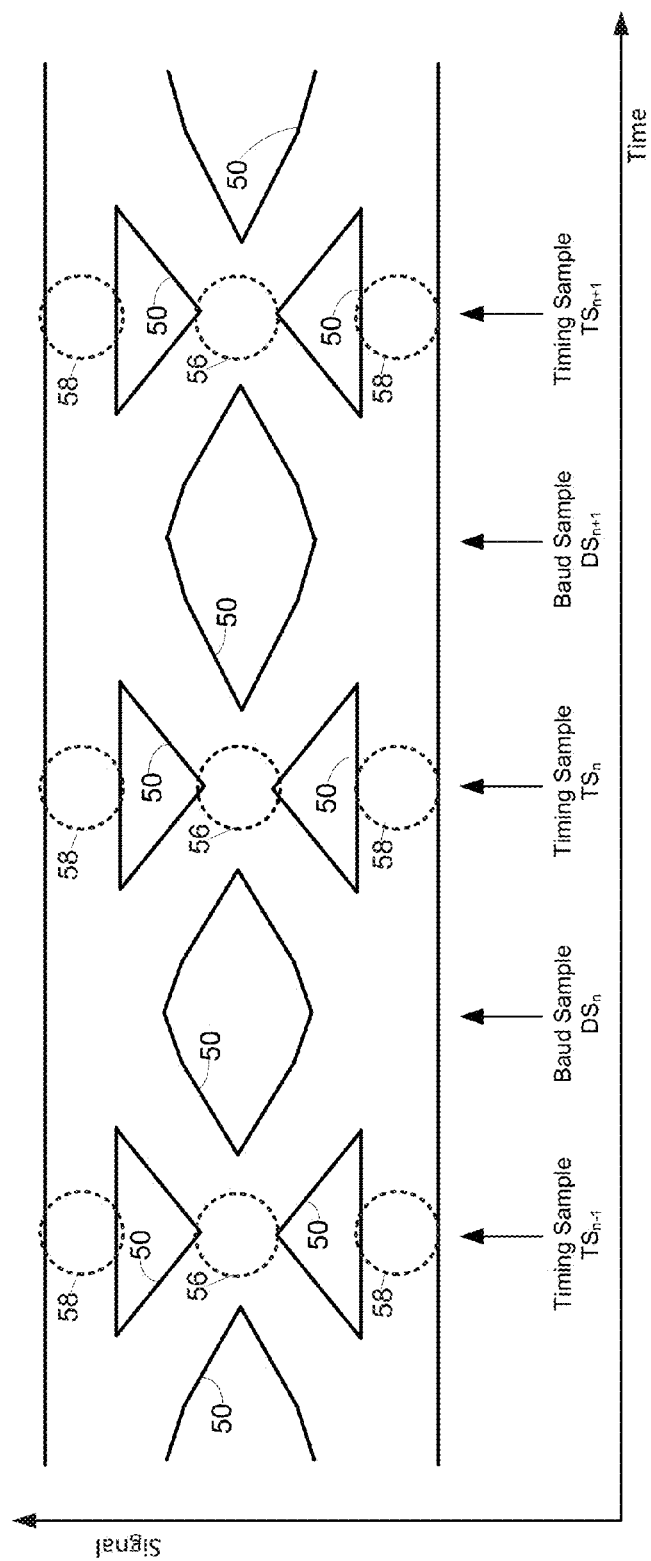
FIG. 7 shows boundaries defining successive eyes with zero-crossing and non-zero-crossing areas.

The present disclosure recognizes that with linear electrical channels, the pre- and post-cursor ISI experienced at Timing Sample N ($TS_n$) is similar for the two following cases: $DS_n$ has the opposite logical value as $DS_{n+1}$ (i.e., a case of Zero-Crossing Transition, ZCT); and $DS_n$ has the same logical value as $DS_{n+1}$ (ie. a case of Non-Zero-Crossing Transition, NZCT). This is shown in FIG. 7 where NZCT zones are at reference numeral 58 and the ZCT zones are at reference numeral 56. The characteristic ISI is similar in these three zones.

Unlike prior art which adapts the receiver EQ based on information at the Timing Sample for cases of ZCT, the present disclosure uses information at the Timing Sample for cases of NZCT, that is, when $DS_{n+1}$ and $DS_n$ are on the same side of the zero signal level. Under benign jitter and spread spectrum clocking conditions, the disclosed method provides similar adapted EQ performance to prior art with respect to horizontal eye opening. Under conditions of strong jitter and spread spectrum clocking, the present disclosure provides much more robust adaptation than current art. Where current art may fail to adapt properly and provide an acceptable eye opening, the method of the present disclosure continues to work well.

Figure 8:
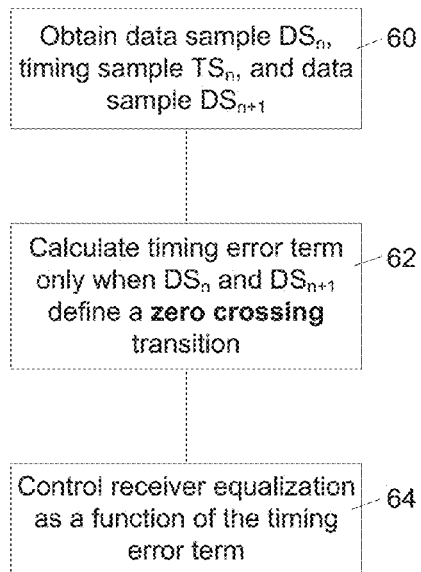
FIG. 8 shows a flowchart of a prior art method of controlling the equalization of a receiver.

FIG. 8 shows a flowchart of a prior art method of controlling the equalization of a receiver. At action 60, a data sample $DS_n$, a timing sample $TS_n$, and a data sample $DS_{n+1}$ are obtained. At action 62, a timing error term is calculated only when $DS_n$ and $DS_{n+1}$ define a ZCT. Finally, at action 64, the receiver equalization is controlled as a function of the timing error term calculated at action 62.

Figure 9:
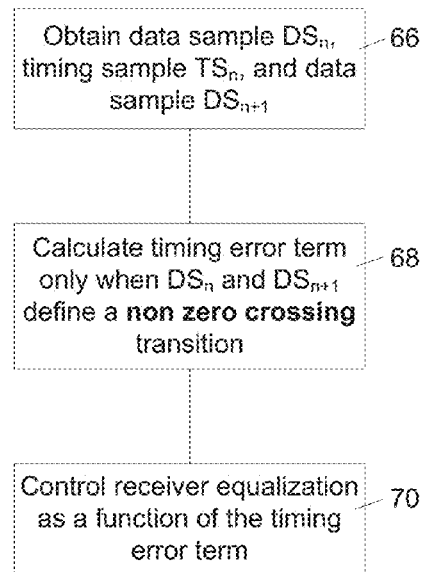
FIG. 9 shows a flowchart of a method in accordance with certain examples of the present disclosure.

FIG. 9 shows a flowchart of a method according to certain embodiments of the present disclosure. At action 66, a data sample $DS_n$, a timing sample $TS_n$, and a data sample $DS_{n+1}$ are obtained. At action 68, a timing error term is calculated only when $DS_n$ and $DS_{n+1}$ define a NZCT. Finally, at action 70, the receiver equalization is controlled as a function of the timing error term calculated at action 68.

For greater certainty, data samples $DS_n$ and $DS_{n+1}$ will define a ZCT when one of them has a positive value and the other has a negative value. A positive value can be "1" or close to "1"; a negative value can be "−1" or close to "−1". Data samples $DS_n$ and $DS_{n+1}$ will define a NZCT when both of them have a positive value or both of them have a negative value.

Figure 10:
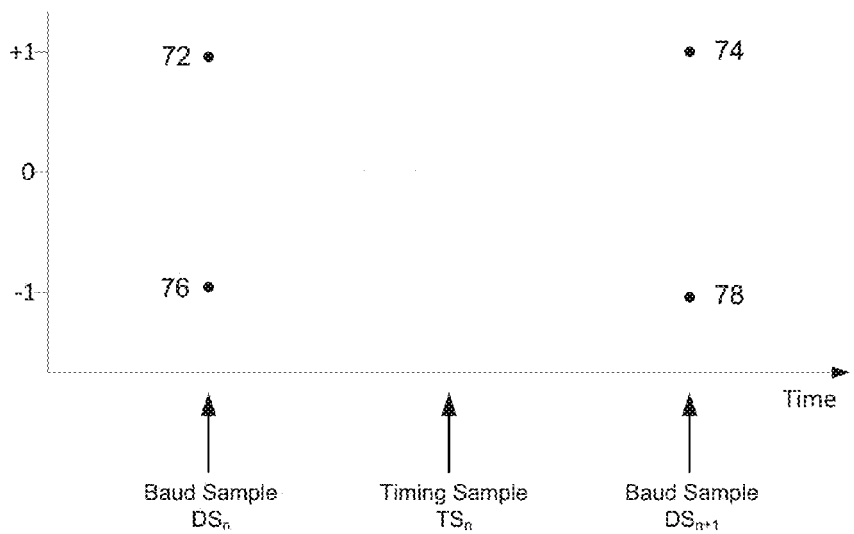
FIG. 10 shows examples of data samples defining zero-crossing and non-zero-crossing transitions.

FIG. 10 shows examples of data samples $DS_n$ 72 and 76, and data samples $DS_{n+1}$ 74 and 78. In the case where $DS_n$ is 72 and $DS_{n+1}$ is 74, $DS_n$ and $DS_{n+1}$ can be said to define a NZCT. That is, the "zero" signal level is not crossed in going from 72 to 74. In the case where $DS_n$ is 72 and $DS_{n+1}$ is 78, DSn and $DS_{n+1}$ can be said to define a ZCT. The "zero" signal level is crossed in going from 72 to 78. In the case where $DS_n$ is 76 and $DS_{n+1}$ is 78, $DS_n$ and $DS_{n+1}$ can be said to define a NZCT. In the case where $DS_n$ is 76 and $DS_{n+1}$ is 74, $DS_n$ and $DS_{n+1}$ can be said to define a ZCT.

Examples of the present disclosure are provided in the context of binary non-return to zero (NRZ) transmission as an example. Those knowledgeable in the art will recognize that the present disclosure is also applicable to other types of transmissions such as, for example, PAM-4 where four amplitude levels are used to carry 2-bits of information per baud symbol.

Figure 11:
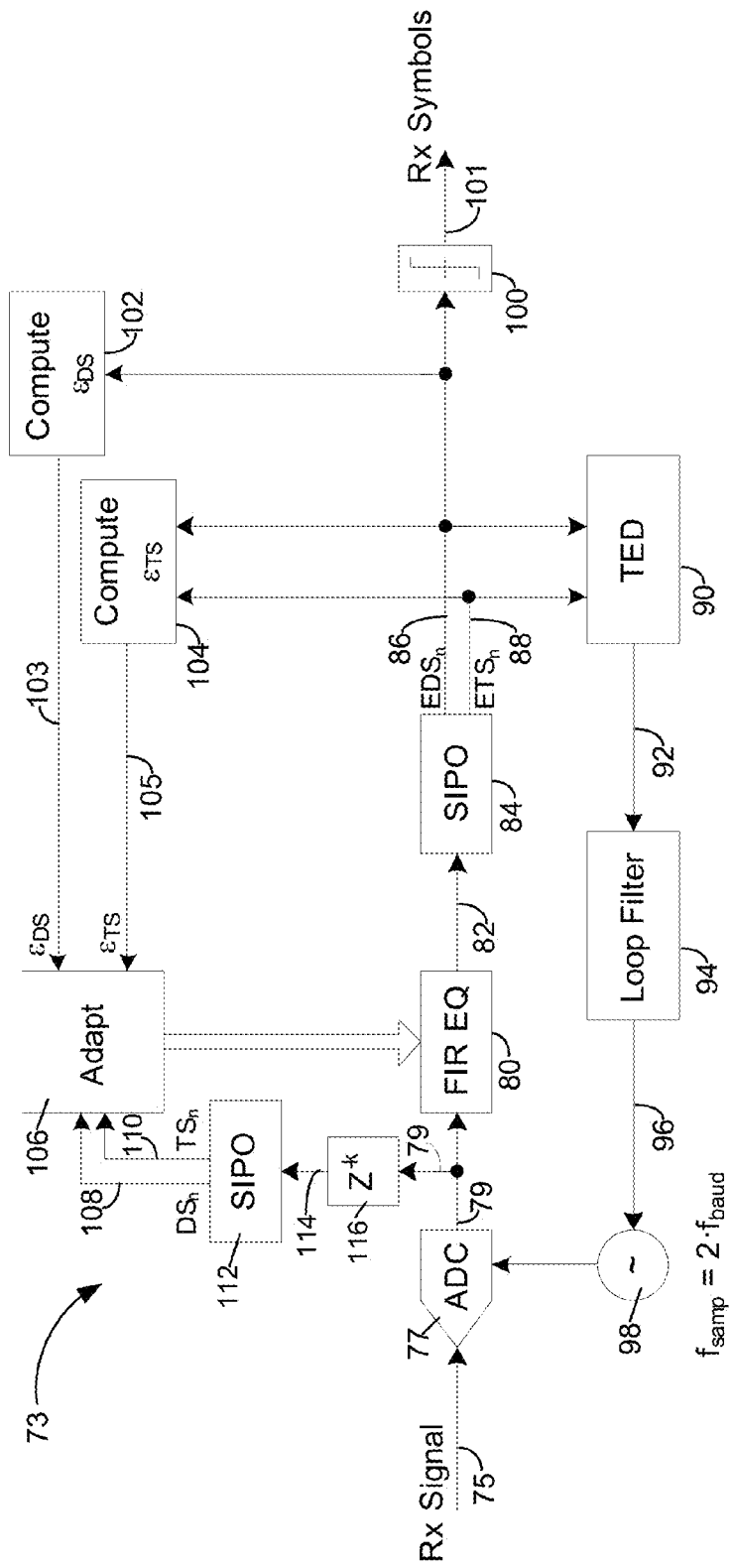
FIG. 11 shows an embodiment of a SerDes receiver in accordance with the present disclosure.

FIG. 11 shows an exemplary implementation of the present disclosure in the context of a SerDes Receiver 73. A received signal (analog signal) 75 is sampled with an ADC 77, which can be referred to as a sampling means. The ADC 77 outputs a sampled signal 79, which is provided to an FIR EQ 80 to remove undesired ISI. The FIR EQ 80 can also be referred to as an equalizer or as equalizing means. The sampled signal 79 can be represented as two interleaved digital signals. One of the two interleaved digital signals is a data signal that comprises data samples sampled at the center of each consecutive symbol of the received analog signal. That is, the data signal comprises data samples $DS_n$, $DS_{n+1}$, $DS_{n+2}$, ... etc. A second of the two interleaved digital signal is a timing signal, the timing signal comprising timing samples sampled midway between the consecutive symbols. That is, the timing signal comprises timing samples $TS_n$, $TS_{n+1}$, $TS_{n+2}$, ... etc. In the context of the present disclosure, the subscript of the data and time signal are indicative of time. For example, the subscript "n−1" represents an earlier time than the subscript "n", which represents an earlier time than "n+1".

Figure 12:
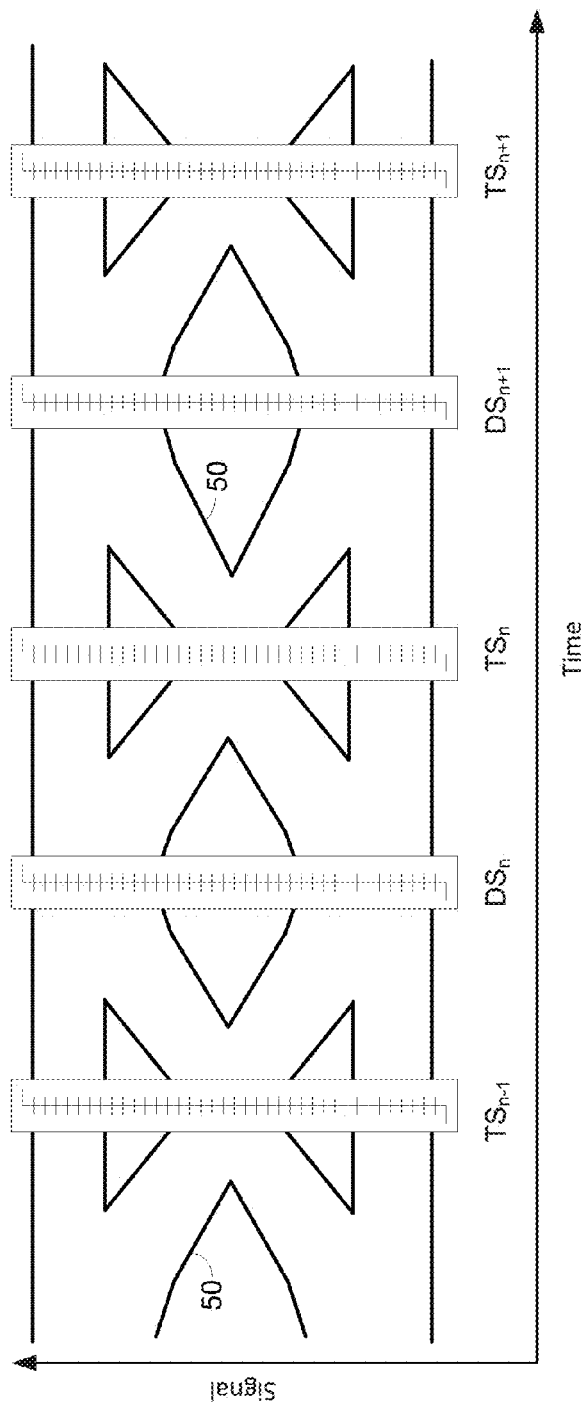
FIG. 12 shows a plot of when samples of an analog signal are taken in the embodiment of FIG. 11.

FIG. 12 shows a plot of when the ADC 77 samples the received signal 77. The sampling occurs at ..., $TS_{n-1}$, $DS_n$, $TS_n$, $DS_{n+1}$, $TS_{n+1}$, ...

Returning to FIG. 11, the FIR EQ 80 outputs an equalized signal 82, which can also be referred to as a modified signal. The equalized signal 82 contains an equalized data signal (the previously-mentioned data signal that has been equalized by the FIR EQ 80) interleaved with an equalized timing signal (the previously-mentioned timing signal that has been equalized by the FIR EQ 80). A SIPO device 84 receives the equalized signal 82 and de-interleaves the equalized data signal from the equalized timing signal. The equalized data signal 86 and the equalized timing signal 88 are shown at the output of the SIPO device 84.

The equalized data signal 86 and the equalized timing signal 88 are provided to a timing error detector 90, which provides an output signal 92 to a loop filter 94. The loop filter 94 outputs a control signal 96 that controls the timing of a sample clock 98; the sample clock 98 controls the ADC 77 in terms of the frequency at which the ADC 76 samples the received signal 75 and at which portion of a symbol the analog to digital conversion is effected by the ADC 77. In the present example, the sampling frequency is twice that of the baud rate.

Referring again to the equalized data signal 86, it is provided also to a slicer 100, which, in the present example, outputs "+1" if an equalized data sample N ($EDS_n$) has a value larger than "0", or outputs a "−1" if $EDS_n$ does not have value larger than "0". Reference numeral 101 represents the output of the slicer 100.

Additionally, the equalized data signal 86 is provided to a data signal error computing module 102, which computes a data signal error term as a function of the equalized data signal 86. The data signal error computing module 102 can compute the data signal error term, $\epsilon_{DS}$ 103 for each $EDS_n$ as, for example:

$$\epsilon_{DS}=\text{sign}(EDS_n)-EDS_n \tag{1}$$

where the sign( ) function outputs "+1" if the argument ($EDS_n$ in this case) is positive, "0" if the argument is zero, and "−1" if the argument is negative.

The SerDes receiver 73 example of FIG. 11 also includes a timing signal error computing module 104 that receives as input, both the equalized data signal 86 and the equalized timing signal 88, and computes a timing signal error term as a function of the equalized data signal 86 and as a function of the equalized timing signal 88. The data error computing module 102 and the timing signal error computing module 104 can also be referred to as a processing means. The timing signal error computing module can compute the timing signal error term, $\epsilon_{TS}$ 105 for each $ETS_n$ 88 as, for example:

$$\epsilon_{TS}=[\text{sign}(ETS_n)-ETS_n]\cdot \text{xnor}(EDS_{n+1}>0, EDS_n>0) \tag{2}$$

where the sign( ) function outputs "+1" if the argument ($ETS_n$ in this case) is positive, "0" if the argument is zero, and "−1" if the argument is negative. The xnor( ) function outputs "1" if both of its arguments have the same value and outputs "0" if its arguments are different (one of the arguments is "1" and the other is "0"). As such, as per equation 2, $\epsilon_{TS}$ will have a non-zero value only when $EDS_{n+1}>0$ and $EDS_n>0$, or when $EDS_{n+1}<0$ and $EDS_n<0$. Otherwise, if $EDS_{n+1}>0$ and $EDS_n<0$, or vice versa, the value of $\epsilon_{TS}$ will be nil. That is, the timing signal error $\epsilon_{TS}$ for a timing signal sample $TS_n$ will be nil in all cases where $DS_n$ and $DS_{n+1}$ define a ZCT. $\epsilon_{TS}$ can be non-nil only when $DS_n$ and $DS_{n+1}$ define a NZCT. As will be understood by the skilled worker, an equivalent form of equation 2 is:

$$\epsilon_{TS}=[\text{sign}(ETS_n)-ETS_n]\cdot \text{xnor}(EDS_{n+1}<0, EDS_n<0) \tag{3}$$

That is, as per equation 3, $\epsilon_{TS}$ will have a non-zero value only when $EDS_{n+1}<0$ and $EDS_n<0$, or when $EDS_{n+1}>0$ and $EDS_n>0$.

In the example of FIG. 11, both $\epsilon_{DS}$ 103 and $\epsilon_{TS}$ 105 are provided to an adapt module 106, which controls the FIR EQ 80 using, for example, an LMS algorithm or any other suitable algorithm. The adapt module can also be referred to as a control means or as a control module. In addition to receiving $\epsilon_{DS}$ 103 and $\epsilon_{TS}$ 105, the adapt module 106 also receives a data signal 108 and a timing signal 110, which are provided at the output of a SIPO device 112. The SIPO device 112 de-interleaves the data signal 108 from the timing signal 110 in response to receiving a time-delayed signal 114 that contains the data signal 108 interleaved with the timing signal 110. The time-delayed signal 114 is the sampled signal 79 delayed by a delay module 116. The reason for the delay module 116 is that processing by the FIR EQ 80, the data signal error computing module 102 and the timing signal error computing module 104, will cause the error terms input to the adapt module 106 to be delayed. As such, the data signal 108 and the timing signal 110 need to be delayed accordingly for proper time alignment. This alignment could be done within the adapt module 106, or explicitly outside the adapt module 106, at the delay module 116.

According to equations 1 and 2 (or 1 and 3), the computed value of $\epsilon_{TS}$ will be zero unless successive baud symbols are the same, that is, when a zero-transition is not expected. Those knowledgeable in the art will recognize that if the xnor( ) function in equation 2 (or equation 3) is replaced with a xor( ) function, the operation of the circuit will be similar to a number of the prior art techniques that adapt the FIR EQ based on the zero-crossing transition between baud symbols.

The adapt module 106 controls the FIR EQ 80 to equalize the sampled signal 79, which contains the data signal 108 interleaved with the timing signal 110, as a function of the timing signal error term $\epsilon_{TS}$ and the data signal error term $\epsilon_{DS}$. When only the timing signal error term is considered, the adapt module 106 controls the FIR EQ 80 in accordance with:

$$Pre2'=Pre2+\mu_{TS}\cdot\epsilon_{TS}\cdot TS_{n+1} \quad (4)$$

$$Pre1'=Pre1+\mu_{TS}\cdot\epsilon_{TS}\cdot DS_{n+1} \quad (5)$$

$$Curs'=Curs+\mu_{TS}\cdot\epsilon_{TS}\cdot TS_n \quad (6)$$

$$Post1'=Post1+\mu_{TS}\cdot\epsilon_{TS}\cdot DS_n \quad (7)$$

$$Post2'=Post2+\mu_{TS}\cdot\epsilon_{TS}\cdot TS_{n-1} \quad (8)$$

When only the data signal error term is considered, the adapt module 106 controls the FIR EQ 80 in accordance with:

$$Pre2'=Pre2+\mu_{DS}\cdot\epsilon_{DS}\cdot DS_{n+1} \quad (9)$$

$$Pre1'=Pre1+\mu_{DS}\cdot\epsilon_{DS}\cdot TS_n \quad (10)$$

$$Curs'=Curs+\mu_{DS}\cdot\epsilon_{DS}\cdot DS_n \quad (11)$$

$$Post1'=Post1+\mu_{DS}\cdot\epsilon_{DS}\cdot TS_{n-1} \quad (12)$$

$$Post2'=Post2+\mu_{DS}\cdot\epsilon_{DS}\cdot DS_{n-1} \quad (13)$$

When both the timing signal error and the data signal error terms are taken into account, the adapt module 106 controls the FIR EQ 80 in accordance with:

$$Pre2'=Pre2+\mu_{TS}\cdot\epsilon_{TS}\cdot TS_{n+1}+\mu_{DS}\cdot\epsilon_{DS}\cdot DS_{n+1} \quad (14)$$

$$Pre1'=Pre1+\mu_{TS}\cdot\epsilon_{TS}\cdot DS_{n+1}+\mu_{DS}\cdot\epsilon_{DS}\cdot TS_n \quad (15)$$

$$Curs'=Curs+\mu_{TS}\cdot\epsilon_{TS}\cdot TS_n+\mu_{DS}\cdot\epsilon_{DS}\cdot DS_n \quad (16)$$

$$Post1'=Post1+\mu_{TS}\cdot\epsilon_{TS}\cdot DS_n+\mu_{DS}\cdot\epsilon_{DS}\cdot TS_{n-1} \quad (17)$$

$$Post2'=Post2+\mu_{TS}\cdot\epsilon_{TS}\cdot TS_{n-1}+\mu_{DS}\cdot\epsilon_{DS}\cdot DS_{n-1} \quad (18)$$

In equations 4-18, the FIR EQ taps (Pre2, Pre1, Curs, Post1, and Post2) are spaced at intervals of ½ baud duration. If a baud-spaced EQ is desired, Pre1 and Post1 are set to zero and not updated. If more taps than specified in equations 4-18 are desired, equations 4-18 can easily be adapted, as would be understood by the skilled worker.

The choice of adapting based on eye-center criterion or non-zero-crossing criterion, or both, is supported through the independent scaling parameters $\mu_{DS}$ and $\mu_{TS}$. Setting either to zero removes that criterion from the adaptation. Setting the scaling parameters $\mu_{DS}$ and $\mu_{TS}$ to a small positive value includes that criterion in the adaptation. When non-zero, the values selected for the scaling parameters can be less than 1, such as ⅟32, or ⅟64, or any other suitable value. Those knowledgeable in the art will understand the fundamental tradeoffs of selecting larger or smaller values for the scaling parameters. In the present example, the signal sample at the output of the FIR EQ 80 is described by equation 18a, where the signal 79 is denoted by $S_n$ and the signal 82 is denoted by $ES_n$.

$$ES_n=Pre2\cdot S_{n+4}+Pre1\cdot S_{n+2}+Curs\cdot S_n+Post1\cdot S_{n-2}+Post2\cdot S_{n-4} \quad (18a)$$

Figure 13:
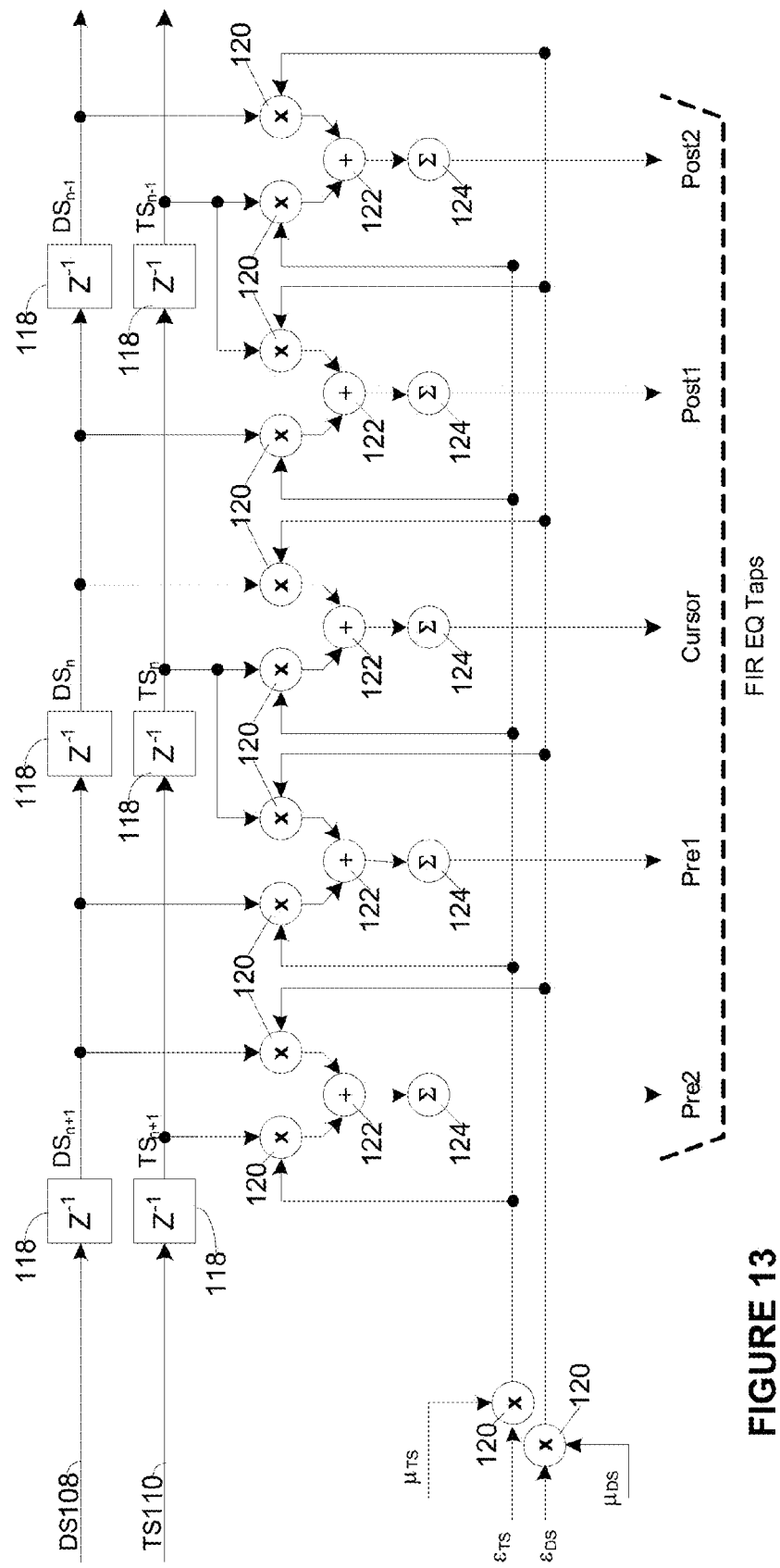
FIG. 13 shows a block diagram of an exemplary implementation of a equalization of signal in accordance with the present disclosure.

A block diagram of an exemplary implementation of equations 14-18 is shown in FIG. 13. This implementation supports the adaptation of 5 T/2-spaced FIR EQ coefficients (taps). Upon initial startup, the summing node for the cursor tap is initialized to a value of 1, and the summing node for all other taps are initialized to a value of 0. Shown in FIG. 13 are the data signal 108 and the timing signal 110, time delays 118, multiplication nodes 120, addition nodes 122, and summation nodes (e.g., running summation) 124.

The exemplary embodiments of FIGS. 11 and 13 can be implemented in hardware and or software.

Figure 14:
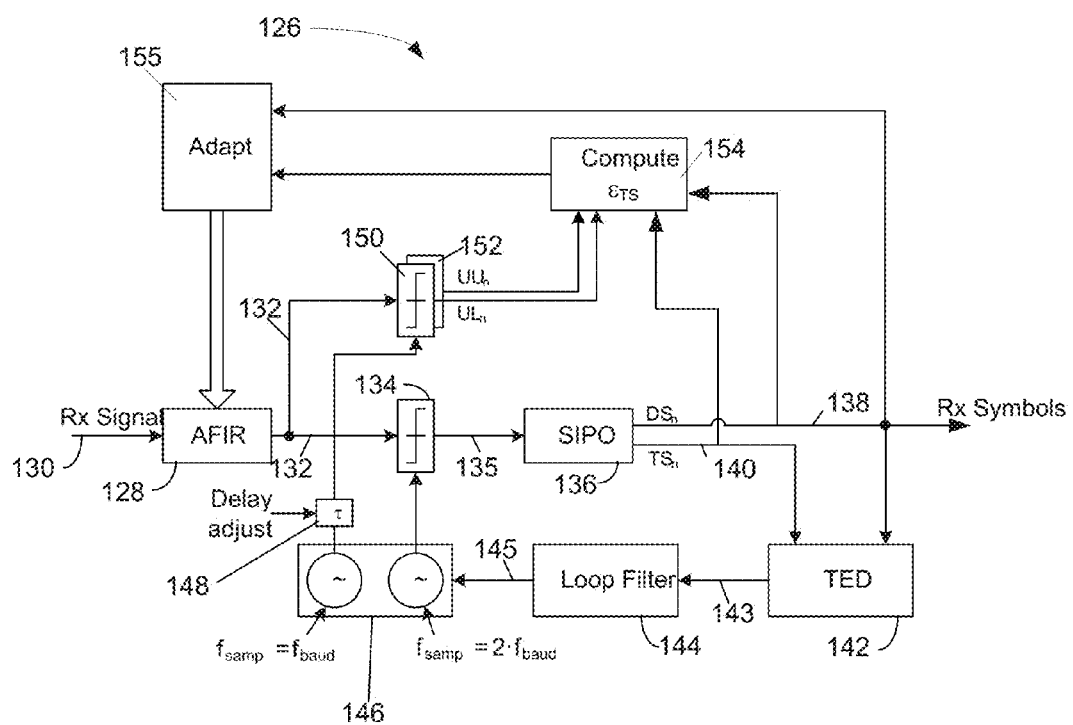
FIG. 14 shows another embodiment of a SerDes receiver in accordance with the present disclosure.

FIG. 14 shows an alternative SerDes receiver architecture in accordance with the present disclosure. The exemplary SerDes receiver 126 of FIG. 14 comprises an Analog FIR (AFIR) 128 used to equalize a received analog signal 130. The AFIR 128 outputs an equalized signal (modified signal) 132, which is sampled with a 1-bit slicer 134 at a rate equal to twice the baud rate of the received analog signal 130. The 1-bit slicer 134 can be referred to as a sampling means. The 1-bit slicer 134 outputs a binary signal 135. The binary signal 135 can be represented as two interleaved digital signals. One of the two interleaved digital signals is a data signal that comprises data samples sampled at the center of each consecutive symbol of the received analog signal. That is, the data signal comprises data samples $DS_n$, $DS_{n+1}$, $DS_{n+2}$, ... etc. A second of the two interleaved digital signal is a timing signal, the timing signal comprising timing samples sampled midway between the consecutive symbols. That is, the timing signal comprises timing samples $TS_n$, $TS_{n+1}$, $TS_{n+2}$, ... etc.

A SIPO device 136 receives the binary signal 135 and de-interleaves the data signal from the timing signal. The data signal 138 and the timing signal 140 are shown at the output of the SIPO device 136.

The data samples $DS_n$, $DS_{n+1}$, $DS_{n+2}$, ... of the data signal 138, and the timing samples are $TS_n$, $TS_{n+1}$, $TS_{n+2}$, ... of the timing signal 140 are used by a timing recovery circuit such that the data samples are aligned in the middle of the eye and the timing samples are aligned with the zero-crossing transitions between baud intervals. The data samples and the timing samples at the output to the SIPO device 136 have a value of either "+1" or "−1".

The data samples 138 and the timing samples 140 are provided to a timing error detector 142, which provides an output signal 143 to a loop filter 144. The loop filter 144 outputs a control signal 145 that controls the timing of a sample clock 146; the sample clock 146 controls the 1-bit slicer 134 in terms of the frequency at which the 1-bit slicer 134 samples the received signal 130 and at which portion of a symbol the analog to digital conversion is effected by the 1-bit slicer 134.

Additionally, the SerDes receiver 126 comprises a slicer 150 set to output utility lower samples ($UL_n$) and a slicer 152 set to output utility upper samples ($UU_n$). The threshold level of the slicer 150 and of the slicer 152 are adjustable. For example, the slicer 150 can be set to output a value of "1" when the signal at the input of the slicer 150 has a value greater than a first threshold value, and a value of "0" otherwise; the slicer 152 can be set to output a value of "1" when the signal at the input of the slicer 152 has a value greater than a second threshold value, and a value of "0" otherwise.

Further, the slicers 150 and 152 are operationally connected to the sample clock 146, which causes the slicers 150 and 152 to sample the equalized signal 132 at a frequency equal to that of the baud rate of the equalized received analog signal 130. A time delay module 148 controls where, with respect to the bits of the received analog signal 130, the sampling is effected. The slicers 150 and 152 can also be referred to as sampling means or as additional sampling means.

Figure 15:
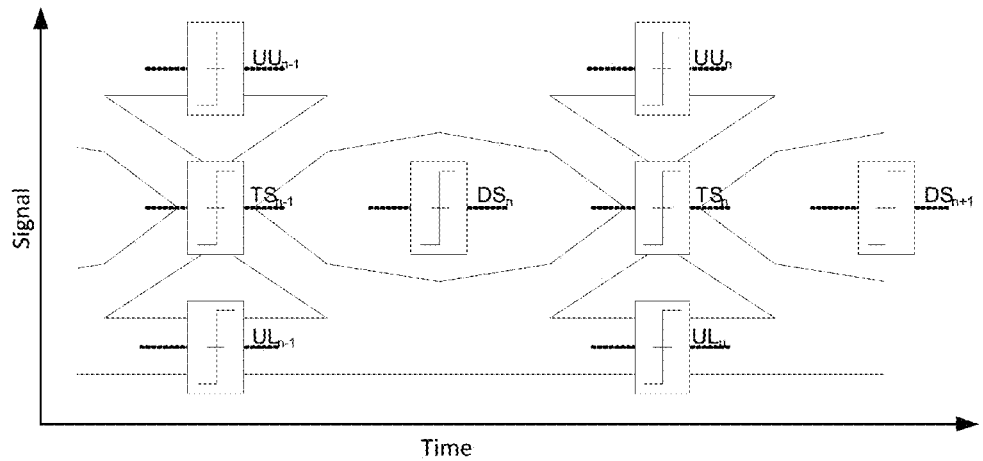
FIG. 15 shows utility upper samples and utility lower samples coincident in time with timing samples, in accordance with the present disclosure.

An example of the sampling of the equalized signal 132 with the 1-bit slicers 150 and 152 is shown at FIG. 15. In FIG. 15, the time delay module 148 is set to have the slicer 150 and the slicer 152 sample the equalized signal 132 coincidently with the slicer 134 sampling the equalized signal 132 to output timing samples $TS_n$.

In the case of FIG. 15, the error on the timing signal can be calculated by the error calculation module 154 as a function of $UU_n$, $TS_n$, $UL_n$, $DS_n$, and $DS_{n+1}$. For example, the error on the timing signal can be computed as:

$$\epsilon_{TS} = \{1-2\cdot[(UU_n \cap TS_n) \cup (UL_n \cap \text{not}(TS_n))]\} \cdot xnor(DS_n, DS_{n+1}) \quad (19)$$

As an example, if $UU_n$ and $TS_n$ are equal to "1" or, if $UL_n=1$ and $TS_n=0$ (not($TS_n$)=1), $\epsilon_{TS}$ will be equal to −1, assuming that $DS_n$ and $DS_{n+1}$ have the same value. However, if either one of $UU_n$ or TSn is equal to "0" and if $UL_n=0$ or not($TS_n$)=0, then $\epsilon_{TS}$ will be equal to "+1", again, assuming that $DS_n$ and $DS_{n+1}$ have the same value. In any case, if $DS_n$ and $DS_{n+1}$ have different values, $\epsilon_{TS}$ will be equal to zero. Table 1 shows $\epsilon_{TS}$ for different combinations of $UU_n$, $TS_n$, $UL_n$, not($TS_n$), $DS_n$, and $DS_{n+1}$. Table 1 recognizes that the only valid combinations of ($UU_n$, $TS_n$, $UL_n$) are {000, 001, 011, 111}. Other combinations are possible only when the threshold voltages are defined such that the condition $V_{UU} > V_{TS} > V_{UL}$ is not satisfied. For invalid codes, it is optional to implement circuitry to detect these conditions and force the error term $\epsilon_{TS}$ to a zero value.

TABLE 1

| $UU_n$ | $TS_n$ | $UL_n$ | not($TS_n$) | $DS_n$ | $DS_{n+1}$ | $\epsilon_{TS}$ |
|---|---|---|---|---|---|---|
| Valid Combinations | | | | | | |
| 0 | 0 | 0 | 1 | 1 | 1 | +1 |
| 0 | 0 | 0 | 1 | 0 | 0 | +1 |
| 0 | 0 | 0 | 1 | 1 | 0 | 0 |
| 0 | 0 | 0 | 1 | 0 | 1 | 0 |
| 0 | 0 | 1 | 1 | 0 | 0 | −1 |
| 0 | 0 | 1 | 1 | 1 | 1 | −1 |
| 0 | 0 | 1 | 1 | 1 | 0 | 0 |
| 0 | 0 | 1 | 1 | 0 | 1 | 0 |
| 0 | 1 | 1 | 0 | 1 | 1 | +1 |
| 0 | 1 | 1 | 0 | 0 | 0 | +1 |
| 0 | 1 | 1 | 0 | 1 | 0 | 0 |
| 0 | 1 | 1 | 0 | 0 | 1 | 0 |
| 1 | 1 | 1 | 0 | 1 | 1 | −1 |
| 1 | 1 | 1 | 0 | 0 | 0 | −1 |
| 1 | 1 | 1 | 0 | 0 | 1 | 0 |
| 1 | 1 | 1 | 0 | 1 | 0 | 0 |
| Invalid Combinations | | | | | | |
| 1 | 0 | 1 | 1 | 1 | 1 | |
| 1 | 1 | 0 | 0 | 1 | 1 | |
| 0 | 1 | 0 | 0 | 1 | 1 | |
| 1 | 0 | 0 | 1 | 1 | 1 | |
| 1 | 0 | 1 | 1 | 1 | 0 | |
| 1 | 1 | 0 | 0 | 1 | 0 | |
| 0 | 1 | 0 | 0 | 1 | 0 | |
| 1 | 0 | 0 | 1 | 1 | 0 | |

TABLE 1-continued

| $UU_n$ | $TS_n$ | $UL_n$ | not($TS_n$) | $DS_n$ | $DS_{n+1}$ | $\epsilon_{TS}$ |
|---|---|---|---|---|---|---|
| 1 | 0 | 1 | 1 | 0 | 1 | |
| 1 | 1 | 0 | 0 | 0 | 1 | |
| 0 | 1 | 0 | 0 | 0 | 1 | |
| 1 | 0 | 0 | 1 | 0 | 1 | |
| 1 | 0 | 1 | 1 | 0 | 0 | |
| 1 | 1 | 0 | 0 | 0 | 0 | |
| 0 | 1 | 0 | 0 | 0 | 0 | |
| 1 | 0 | 0 | 1 | 0 | 0 | |

The error calculation module 154 provides the error on the timing signal to an adapt module 155, which controls the AFIR 128.

Figure 16:
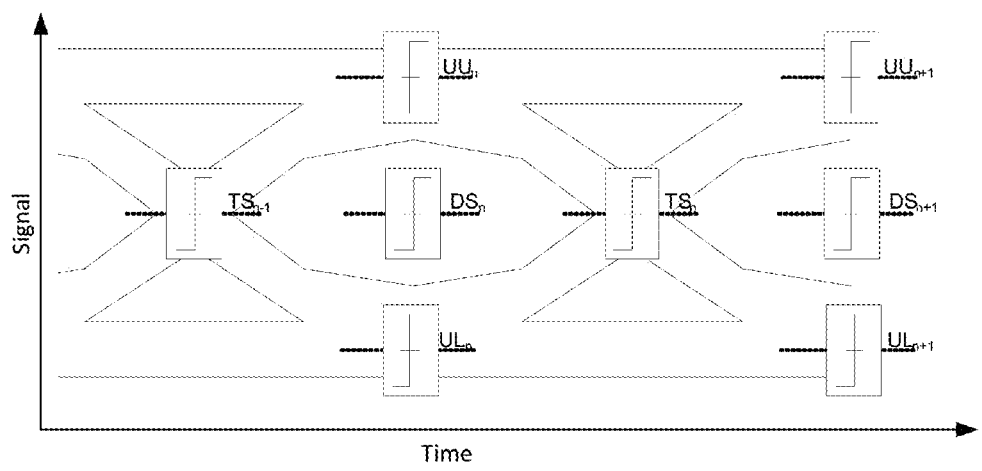
FIG. 16 shows utility upper samples and utility lower samples coincident in time with data samples, in accordance with the present disclosure.

If, instead of having the time delay module 148 is set to have the slicer 150 and the slicer 152 sample the equalized signal 132 coincidently with the slicer 134 sampling the equalized signal 132 to output a timing sample, as shown at FIG. 15, the time delay module 148 is set to have the slicer 150 and the slicer 152 sample the equalized signal 132 coincidently with the slicer 134 sampling the equalized signal 132 to output data sample $DS_n$, as shown at FIG. 16, the error $\epsilon_{DS}$ on the data sample can be calculate as a function of $UU_n$, $UL_n$ and $DS_n$:

$$\epsilon_{DS} = \{1-2\cdot[(UU_n \cap DS_n) \cup (UL_n \cap \text{not}(DS_n))]\} \quad (20)$$

Table 2 shows $\epsilon_{DS}$ for different combinations of $UU_n$, $UL_n$, $DS_n$, and not($DS_n$). Table 2 recognizes that the only valid combinations of ($UU_n$, $DS_n$, $UL_n$) are {000, 001, 011, 111}. Other combinations are possible only when the threshold voltages are defined such that the condition $V_{UU} > V_{DS} > V_{UL}$ is not satisfied. For invalid codes, it is optional to implement circuitry to detect these conditions and force the error term $\epsilon_{DS}$ to a zero value.

TABLE 2

| $UU_n$ | $DS_n$ | $UL_n$ | not($DS_n$) | $\epsilon_{DS}$ |
|---|---|---|---|---|
| Valid Combinations | | | | |
| 0 | 0 | 0 | 1 | +1 |
| 0 | 0 | 1 | 1 | −1 |
| 0 | 1 | 1 | 0 | +1 |
| 1 | 1 | 1 | 0 | −1 |
| Invalid Combinations | | | | |
| 1 | 0 | 1 | 1 | |
| 1 | 1 | 0 | 0 | |
| 0 | 1 | 0 | 0 | |
| 1 | 0 | 0 | 1 | |

Figure 17:
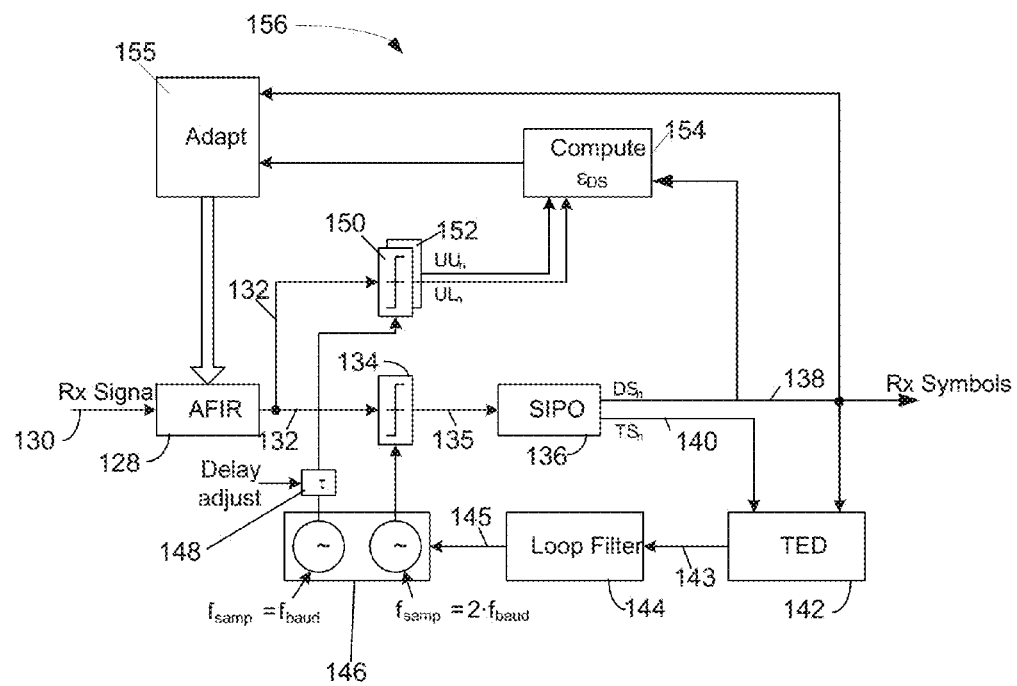
FIG. 17 shows yet another embodiment of a SerDes receiver in accordance with the present disclosure.

FIG. 17 shows another exemplary SerDes receiver 156, which is the same as the SerDes receiver 126 of FIG. 14 except that the time delay module 148 is set to have the slicer 150 and the slicer 152 sample the equalized signal 132 coincidently with the slicer 134 sampling the equalized signal 132 to output data sample $DS_n$, as shown at FIG. 16. Also, the error calculation module 154 in FIG. 17 does not require $TS_n$ as an input.

The computation of the timing sample error and of the data sample error defined at equations 19 and 20 use standard Boolean notation. The terms inside the square brackets, [ ], yield Boolean values that are then converted to unit amplitude signed values. The multiplication by the xnor( ) term preserves the value or forces to zero. It is important to emphasize that the UU samples used in computing of $\epsilon_{TS}$ have the timing alignment illustrated in FIG. 15 while the UU samples used in computation of $\epsilon_{DS}$ have the timing alignment illustrated in FIG. 16. With only a single pair of utility samplers (1-bit slicers 150 and 152) it is not possible to simultaneously compute $\epsilon_{TS}$ and $\epsilon_{DS}$. Those knowledgeable in the art will recognize that using additional utility samplers (1-bit samplers) will allow simultaneous computation of $\epsilon_{TS}$ and $\epsilon_{DS}$.

The adapt module 155 controls the AFIR 128 to equalize the received analog signal 130. When only the timing signal error term is considered, i.e., in the case of the non-zero-crossing criterion related to the SerDes receiver 126 of FIG. 14 and the sampling of FIG. 15, the adapt module 155 controls the AFIR 128 in accordance with:

$$Pre' = Pre + \mu_{TS} \cdot \epsilon_{TS} \cdot DS_{n+2} \quad (21)$$

$$Curs' = Curs + \mu_{TS} \cdot \epsilon_{TS} \cdot DS_n \quad (22)$$

$$Post' = Post + \mu_{TS} \cdot \epsilon_{TS} \cdot DS_{n-1} \quad (23)$$

Equations 21, 22, and 23 assume that the AFIR 128 is a 3-tap FIR with baud spacing.

When only the data signal error term is considered, i.e., in the case of the eye-center criterion related to the SerDes receiver 156 of FIG. 17 and the sampling of FIG. 16, the adapt module 155 controls the AFIR 128 in accordance with:

$$Pre' = Pre + \mu_{DS} \cdot \epsilon_{DS} \cdot DS_{n+1} \quad (24)$$

$$Curs' = Curs + 82_{DS} \cdot \epsilon_{DS} \cdot DS_n \quad (25)$$

$$Post' = Post + \mu_{TS} \cdot \epsilon_{TS} \cdot DS_{n-1} \quad (26)$$

Equations 24, 25, and 26 assume that the AFIR 128 is a 3-tap FIR with baud spacing.

When both the data signal error term and the timing signal error term are considered, the adapt module 155 controls the AFIR 128 in accordance with:

$$Pre' = Pre + \mu_{TS} \cdot \epsilon_{TS} \cdot DS_{n+2} + \mu_{DS} \cdot \epsilon_{DS} \cdot DS_{n+1} \quad (27)$$

$$Curs' = Curs + \mu_{TS} \cdot \epsilon_{TS} \cdot DS_{n+1} + \mu_{DS} \cdot \epsilon_{DS} \cdot DS_{n+1} \quad (28)$$

$$Post' = Post + \mu_{TS} \cdot \epsilon_{TS} \cdot DS_{n-1} + \mu_{DS} \cdot \epsilon_{DS} \cdot DS_{n-1} \quad (29)$$

The terms $\mu_{TS}$ and $\mu_{DS}$ are non-negative scalars, having a value typically less than 1, that control the adaptation. When set to zero, they remove that criterion from adaptation. When set to small positive values such as $\frac{1}{32}$ or $\frac{1}{64}$, they include that criterion in the adaptation of the AFIR 128.

Figure 18:
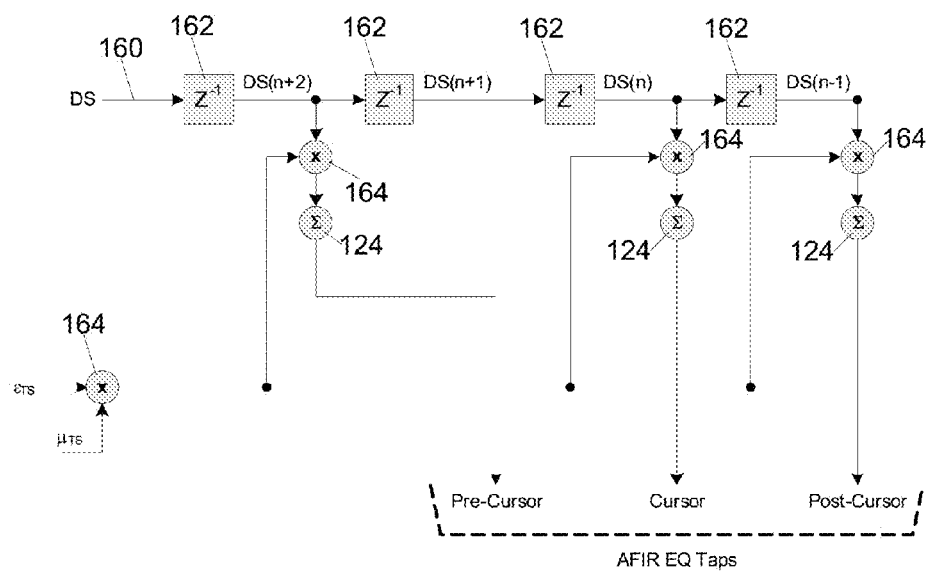
FIG. 18 shows a block diagram of another exemplary implementation of a equalization of signal in accordance with the present disclosure.
Figure 19:
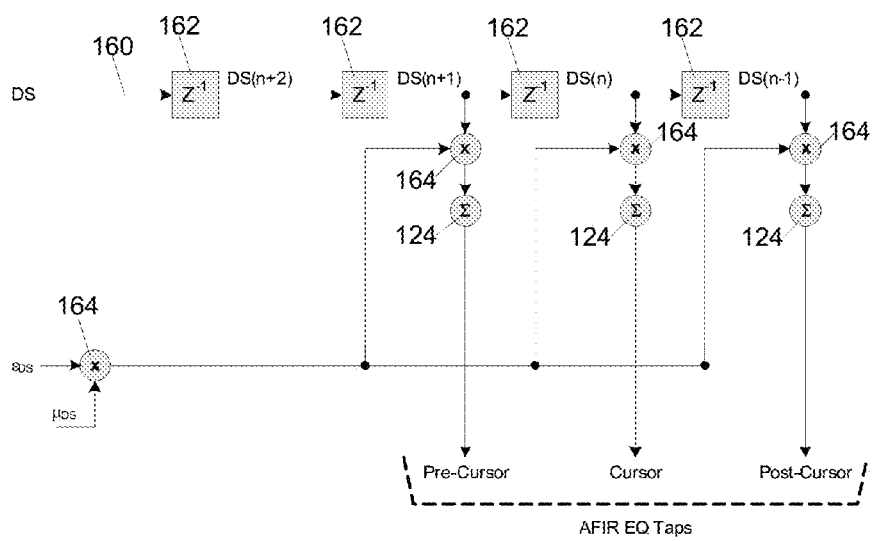
FIG. 19 shows a block diagram of yet another exemplary implementation of a equalization of signal in accordance with the present disclosure.

A block diagram of an exemplary implementation of equations 21, 22, and 23 is shown at FIG. 18. A block diagram of an exemplary implementation of equations, 24, 25, and 26 is shown at FIG. 19. As will be understood by the skilled worker, there are strong similarities between the structures of FIGS. 18 and 19; those knowledgeable in the art will recognize the means by which these two structures can be combined into a single structure.

In the embodiment of FIG. 18 and in the embodiment of FIG. 19, upon initial startup, the summing node 124 (running summation node) for the cursor tap is initialized to a value of 1, and the summing nodes 124 for all other taps are initialized to a value of 0. Shown in FIGS. 18 and 19 is the data signal 160, time delays 162, multiplication nodes 164, addition nodes 122, and summation nodes (e.g., running summation) 124.

The present disclosure provides details on ADC and slicer based NRZ SerDes receivers, with variations for baud-spaced versus fractional-spaced FIR EQs and Analog versus Digital FIR EQs.

The present disclosure is also applicable to multi-level SerDes signaling schemes such as PAM-4 (4-level Pulse Amplitude Modulation). The computation of the error terms $\epsilon_{DS}$ and $\epsilon_{TS}$ will need to be generalized but this should be relatively simple for someone knowledgeable in the art based on the inventive description herein. This applies to both ADC and slicer based receivers. For slicer based receivers, additional alterations will be required for the Adapt block to convert the slicer bit pattern to a numerical value representing the received symbol (e.g., +/−1, +/−3 for PAM-4).

The present disclosure is presented in the context of a serialized architecture. At very high SerDes data rates, such as above 1 GHz for example, it is often necessary to implement the receiver in a parallel manner to simultaneously process multiple baud periods. The scope of the present disclosure includes such parallel implementations.

Examples of the present disclosure describe updating all of the available EQ coefficients. In some cases, it may be desirable to fix some of the EQ coefficients at specific values and use the corresponding update equations to adjust other circuit parameters. For example, the cursor tap coefficient can be fixed at a unit value and the update equation used to adjust the gain setting of a variable gain amplifier in the signal path.

Figure 20:
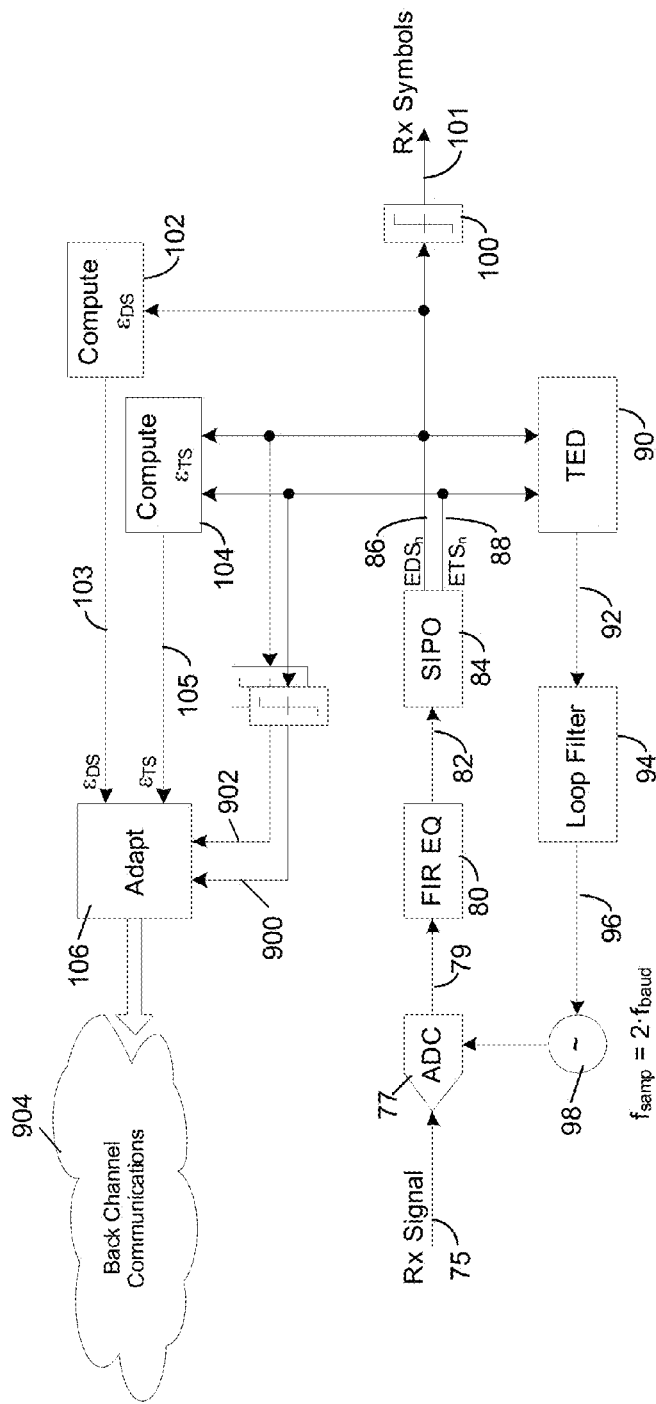
FIG. 20 shows an embodiment of a receiver that adapts a feed forward equalizer of an upstream transmitter, in accordance with certain embodiments of the present disclosure.

Examples of the present disclosure show the adaptation of an equalizer located within a receiver. It is equally possible to adapt an equalizer located within the sending transmitter. There will likely be increased adaptation loop latency in this case which must be managed, but this is common knowledge to those in the art. An exemplary design of a receiver that adapts a feed forward equalizer (FFE) of an upstream Transmitter is shown in FIG. 20. The architecture is similar to that of FIG. 11, except the input of ADC 77 samples to the Adapt block 106 of FIG. 11 is replaced with the equalized and sliced Timing and Data Samples 900 and 902 respectively. Also the updated EQ tap values are to be communicated from the adapt module 106 to the upstream transmitter (not shown) through an available Back-Channel Communication channel 904 that is often a part of the SerDes data protocol.

Figure 21:
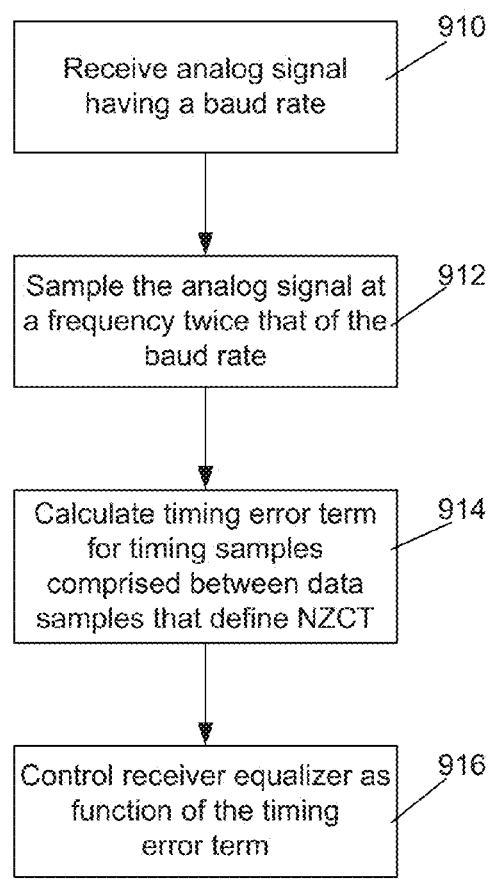
FIG. 21 shows a flowchart of another method in accordance with certain examples of the present disclosure.

FIG. 21 shows a flowchart of a method according to certain embodiments of the present disclosure. At action 910, an analog signal having a baud rate is received. In the context of the embodiment (example) of FIG. 11, the analog signal is received 75 is received at the ADC 77. In the context of the embodiments (examples) of FIGS. 14 and 17, the equalized signal 132, which is an analog signal is received at the slicer 134.

Returning to FIG. 21, at action 912, the analog signal is sampled. In the context of the example of FIG. 11, the analog signal is sampled by the ADC 77. In the context of the embodiments of FIGS. 14 and 17, the analog signal is sampled at the slicer 134. Action 912 results in obtaining data samples and timing samples.

Again with reference to FIG. 21, at action 914, a timing error term is calculated for timing samples comprised between data samples that define NZCT. In the context of the embodiment of FIG. 11, this can be achieved through, for example, equation 2. In the context of the embodiment of FIG. 14, this can be achieved through, equation 14.

Referring yet again to FIG. 21, at action 916, the receiver equalizer is controls as a function of the timing error term. In the context of the embodiment of FIG. 14, this can be achieved through the adapt module 106, which receives the timing error term and control the FIR EQ 80 as a function of the timing error term. In the context of the embodiment of FIG. 14, this can be achieved by the adapt module 155, which receives the timing error term and control the analog FIR 128 as a function of the timing error term.

Examples of the present disclosure show the combination of center eye adaptation criterion and non-zero-crossing adaptation criterion. This is not restrictive and numerous other criteria may be included in the adaptation process without departing from the scope of the present disclosure.

Examples of the present disclosure assume a sampling rate of twice the signal baud rate. This is the minimum sample rate. Higher sample rates can easily be accommodated, as will be understood by the skilled worker.

This present disclosure provides an improved method and apparatus for adapting inter-symbol interference compensating equalizers in a SerDes receiver. The improved adaptation provides increased tolerance to other jitter sources and is more robust in the presence of strong timing impairments. Advantageously, the present disclosure provides better jitter performance with less complex and lower power SerDes architectures.

In some embodiments of the present disclosure for high speed serdes receivers, it is possible to incorporate the computation of the error terms and the adaptation of the EQ filter taps in RTL (Register Transfer Level) cast in a standard CMOS silicon device. The adaptation portion can be part of a larger adaptation engine that implements the adaptation of several components in a round-robin fashion, or it can be separate and dedicated for each and every SerDes receiver. A state machine to orchestrate the adaptation procedure can also be implemented within RTL.

In other embodiments can have the error computation and filter tap adaptation performed by a firmware based processor using data captured by the SerDes. This processor could be incorporated within the same device as the SerDes receiver or could be off-chip. It is further possible that the computation burden can be shared by RTL and firmware based processing.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of controlling a receiver equalizer, the method comprising:
   receiving an analog signal having a baud rate;
   sampling the analog signal at a sampling rate of twice that of the baud rate, the sampling to obtain a sampled signal that includes two interleaved digital signals, a first signal of the two interleaved digital signals being a data signal, the data signal comprising data samples sampled at a center of each consecutive symbol of the analog signal, a second signal of the two interleaved digital signals being a timing signal, the timing signal comprising timing samples sampled between consecutive symbols of the analog signal, and the timing samples comprising zero crossing transitions and non-zero crossing transitions;
   identifying the timing samples of the non-zero crossing transitions;
   calculating a timing error term for the timing samples of the non-zero crossing transitions; and
   controlling the receiver equalizer as a function of the timing error term.

2. The method of claim 1 further comprising calculating a data error term for the data samples, wherein controlling the receiver equalizer is also as a function of the data error term.

3. The method of claim 1 wherein the receiver equalizer is a digital finite impulse response equalizer (FIR EQ), the method further comprising providing the data signal and the timing signal to the digital FIR EQ to obtain an equalized data signal and an equalized timing signal, wherein calculating the timing error term includes calculating the timing error term as a function of the equalized data signal and as a function of the equalized timing signal.

4. The method of claim 3 wherein the digital FIR EQ includes taps having tap values depending on the timing error term and on at least one of timing samples of the timing signal and data samples of the data signal.

5. The method of claim 4 wherein the taps are spaced at time intervals equal to half the baud rate.

6. The method of claim 4 wherein the taps are spaced at time intervals equal to the baud rate.

7. The method of claim 1 wherein calculating the timing error term comprises calculating the timing error term for the timing samples of only the non-zero crossing transitions.

8. A receiver comprising:
   a sampler for sampling an analog signal having a baud rate, the sampler to sample the analog signal at a sampling rate of twice that of the baud rate, the sampling to obtain a sampled signal that includes two interleaved digital signals, a first signal of the two interleaved digital signals being a data signal, the data signal comprising data samples sampled at a center of each consecutive symbol of the analog signal, a second signal of the two interleaved digital signals being a timing signal, the timing signal comprising timing samples sampled between consecutive symbols of the analog signal, and the timing samples comprising zero crossing transitions and non-zero crossing transitions;
   a processor operationally connected to the sampler, the processor to identify the timing samples of the non-zero crossing transitions and calculate a timing error term of the timing samples of the non-zero crossing transitions;
   an equalizer to equalize one of the sampled signal and the analog signal; and
   a control module operationally connected to the processor and to the equalizer, the control module to control the equalizer as a function of the timing error term.

9. The receiver of claim 8 wherein:
the processor is also for calculating a data error term for the data samples; and
the control module is to control equalizer also as a function of the data error term.

10. The receiver of claim 8 wherein:
the equalizer is a digital finite impulse response equalizer (FIR EQ), the digital FIR EQ to receive the data signal and the timing signal and to equalize the data signal and the timing signal to obtain an equalized data signal and an equalized timing signal; and
the processor is to calculate the timing error term as a function of the equalized data signal and as a function of the equalized timing signal.

11. The receiver of claim 10 wherein the digital FIR EQ calculates tap values that depend on the timing error term and on at least one of timing samples of the timing signal and data samples of the data signal.

12. The receiver of claim 11 the taps are spaced at time intervals equal to half the baud rate.

13. The receiver of claim 11 wherein the taps are spaced at time intervals equal to the baud rate.

14. The receiver of claim 10 wherein the sampler is an analog to digital converter.

15. The receiver of claim 8 wherein the processor is configured to calculate the timing error term for the timing samples of only the non-zero crossing transitions.

\* \* \* \* \*